Sept. 15, 1959  M. F. BARBER ET AL  2,903,819
ARTIFICIAL BIRD
Filed Dec. 15, 1958
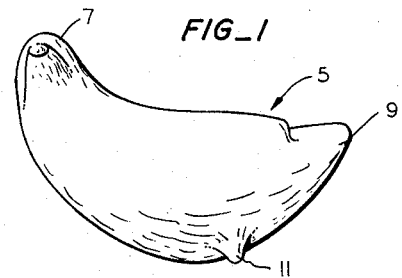
FIG_1
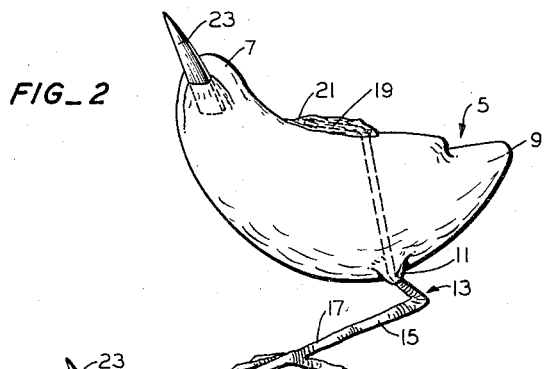
FIG_2
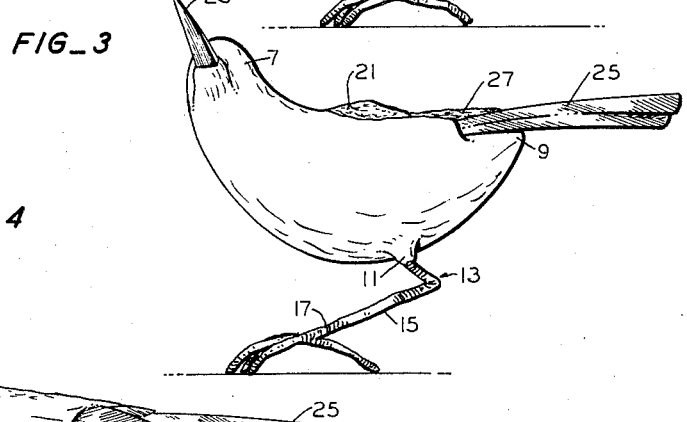
FIG_3
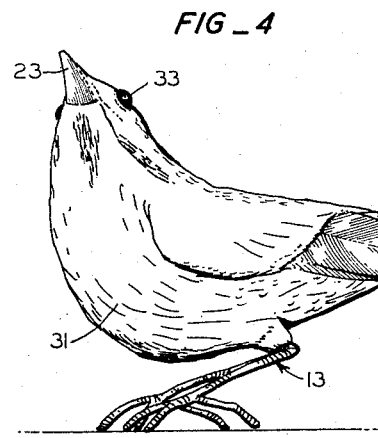
FIG_4
INVENTORS
MICHAEL F. BARBER
ALFRED H. RAUBITSCHEK
ECKHOFF & SLICK
ATTORNEYS
BY
A MEMBER OF THE FIRM

United States Patent Office 2,903,819
Patented Sept. 15, 1959

2,903,819

ARTIFICIAL BIRD

Michael F. Barber, Redwood City, and Alfred H. Raubitschek, El Cerrito, Calif.

Application December 15, 1958, Serial No. 780,441

4 Claims. (Cl. 46—156)

This invention relates to a process of making an artificial bird of great realism. Birds made in accordance with the present invention are very realistic and from a distance of a few feet can scarcely be told from a natural bird.

It is therefore an object of the present invention to provide a method for making an artificial bird.

Another object of this invention is to provide a process for making an artificial bird using relatively inexpensive raw materials which can be easily assembled to make the finished bird.

Another object of this invention is to provide an artificial bird preferably made with a soft plastic body shell and to provide novel means of fastening the legs to the bird to give strength and realism to the structure.

In the drawings forming a part of this application:

Figure 1 is a perspective view of a hollow body shell which is used to form the body of the bird;

Figure 2 is a perspective view, similar to Figure 1, showing an intermediate stage of the construction wherein the beak and legs have been inserted;

Figure 3 is a more advanced view showing the bird's tail feathers inserted;

Figure 4 is a perspective view of the completed bird.

Turning now to a description of the drawings by reference characters, there is shown a hollow body shell generally designated 5. The hollow body shell is preferably a thin hollow shell of a soft plastic such as a vinyl plastic. However, other shells can be used, such as cotton wool with a binder, papier-maché or a ceramic body. The soft plastic body shell is preferred because of its low cost, light weight and ease of working. It will be noted that the body shell is generally shaped to conform with the outline of a bird following the general outline of a head 7 and a tail portion 9. The body shell has slight protuberances 11 for receiving the legs of the bird. For making the bird, the legs, generally designated 13, are first inserted. It will be noted that the legs 13 consist of wire 15 which has been wrapped with thread 17. Preferably two different colors of thread are used to provide the generally banded appearance of natural bird legs. The legs extend through the protuberances 11 into the body of the bird and are brought out of the top of the bird and bent over as at 19 and cemented in place. By passing the legs completely through the body of the bird, two points of attachment, spaced a considerable distance apart, are provided which gives the necessary structural strength. Thin strips of cotton 21 are cemented over the point of attachment of the legs 19 and onto the body of the bird to hold the legs firmly in place and to provide a smooth unbroken back structure. The bill 23 is next inserted in the body of the bird and cemented into place. If desired, the hollow shell 5 may have an opening for receiving the bill or it may merely be forced into the body shell. The bill 23 is made of a relatively hard solid material such as plastic or pressed paper.

Natural tail feathers 25 are then cemented to the back of the bird and the point of attachment of the feathers covered with another strip of cotton 27 which is also glued into place. The tail feathers 25 may be made from any suitable natural feathers, such as chicken feathers which have been cut to the proper shape and dyed if necessary. Similarly, wing feathers 29 are then applied to the bird and the point of attachment of the feathers covered with thin cotton batting as before. A layer of cotton is then laid on the body of the bird, very carefully, laying on a few fibers at a time using rubber cement. The fibers of cotton are put on very carefully ("teased on") to produce a very soft and realistic appearance and may be held in place by using a water-soluble paste, preferably casein, or one which will not mildew. If desired, the cotton layers which are put on are predyed. Eyes 33 are then glued onto the bird. At this point, the bird may or may not be painted or touched up with water colors to produce a more realistic effect. The bird is then dried which completes the operation.

It is believed apparent from the foregoing description that we have provided a method of making a bird which gives a very realistic appearance utilizing relatively inexpensive raw materials.

We claim:

1. The process of making an artificial bird comprising providing a relatively soft body shell of the general outline of a bird, inserting a beak and wire legs therein, said wire legs extending from the bottom of the bird, completely through the hollow shell and out the back of the bird, bending over the ends of said legs on top of the bird and fastening them in place on top of the bird, fastening natural tail and wing feathers and a beak on said bird, covering the point of attachment of said feathers with a thin layer of cotton, brushing a thin layer of cotton and an adhesive over the entire body shell and attaching eyes to said bird.

2. The process of claim 1 wherein the legs consist of wires wrapped with thread.

3. The process of claim 1 wherein the body shell is a thin hollow shell of a soft plastic material.

4. An artificial bird having a soft, hollow body shell having attached thereto natural tail and wing feathers, wire legs extending from a point below the body of the bird, completely through the said hollow shell and out of the back of the bird and having their upper ends bent on top of the bird and fastened in place thereon, said points of attachment of said wire leg tops, natural tail and feathers being covered by thin strips of cotton cemented thereto, and a thin layer of cotton and adhesive covering the entire body shell.

References Cited in the file of this patent

UNITED STATES PATENTS

| 232,928 | Bodurtha | Oct. 5, 1880 |
| 2,663,970 | Brodrib | Dec. 29, 1953 |